United States Patent [19]
Umeda et al.

[11] Patent Number: 5,694,311
[45] Date of Patent: Dec. 2, 1997

[54] POWER SUPPLY SYSTEM

[75] Inventors: Atsushi Umeda, Anjo; Makoto Taniguchi; Shin Kusase, both of Obu, all of Japan

[73] Assignee: Nippondenso Co., Ltd., Kariya, Japan

[21] Appl. No.: 624,215

[22] Filed: Mar. 29, 1996

[30] Foreign Application Priority Data

Mar. 31, 1995 [JP] Japan .................................. 7-075333
May 11, 1995 [JP] Japan .................................. 7-112793

[51] Int. Cl.⁶ .......................... H02M 5/42; H02P 9/04
[52] U.S. Cl. ........................................ 363/89; 322/16
[58] Field of Search ........................ 363/52, 53, 89, 363/125, 127; 322/15, 16, 28, 37

[56] References Cited

U.S. PATENT DOCUMENTS

| | | | |
|---|---|---|---|
| 4,808,866 | 2/1989 | Kawazoe et al. | 363/89 |
| 4,985,743 | 1/1991 | Tokura et al. | 357/39 |
| 5,059,886 | 10/1991 | Nishimura et al. | 322/28 |
| 5,233,215 | 8/1993 | Baliga | 257/490 |
| 5,543,703 | 8/1996 | Kusase et al. | 322/16 |

FOREIGN PATENT DOCUMENTS

| | | |
|---|---|---|
| 3824836 | 2/1989 | Germany . |
| 61-80858 | 4/1986 | Japan . |
| 63-202255 | 8/1988 | Japan . |
| 4-138030 | 5/1992 | Japan . |
| 5-276686 | 10/1993 | Japan . |

*Primary Examiner*—Matthew V. Nguyen
*Attorney, Agent, or Firm*—Cushman, Darby & Cushman IP Group of Pillsbury Madison & Sutro LLP

[57] ABSTRACT

A power supply system has a three-phase alternating current generator, a storage battery, and a three-phase rectifying device connected between the alternating current generator and the storage battery. The rectifying device includes three SiC-MOSFETS which are turned on when the corresponding alternating voltage is positive and turned off when the corresponding alternating voltage is negative. A duty control device switches each of the three SiC-MOSFETS on and off according to a selected duty ratio so that the alternating current generator can generate an optimum voltage in proportion to a rotational speed of a rotor of the alternating current generator.

29 Claims, 6 Drawing Sheets

POWER SUPPLY SYSTEM

CROSS REFERENCE TO RELATED APPLICATION

This application is based upon and claims priority from Japanese Patent Applications No. Hei 7-75333 filed Mar. 31, 1995 and No. Hei 7-112793 filed May 11, 1995, the contents of which are incorporated herein by reference.

BACKGROUND OF THE INVENTION

1. Field of the Invention

The present invention relates to a power supply system, which is specifically suitable for a vehicular power supply system having an alternating current generator.

2. Related Art

In recent years, a need has been recognized for a vehicular power supply system which can efficiently use the output from an alternating current generator, because the electrical loads placed on vehicles have been increasing. Japanese Patent Application Laid-Open No. Hei 5-276686 discloses a power supply apparatus for a vehicle which produces an optimum generating voltage so as to supply a maximum output. The optimum generating voltage varies in response to the rotational speed of a rotor of the alternating current generator. In the power supply apparatus, an output of the alternating current generator is alternately connected to and disconnected from a battery at a high frequency and at a duty cycle controlled by a thyristor employed as a rectifier. As a result, the alternating current generator can be operated so as to supply an optimum generating voltage independent of the battery voltage.

However, surge voltages may be generated as a result of current flowing through the thyristor when the output of the alternating current generator is alternately connected and disconnected. Such surge voltages may damage the thyristor.

As a countermeasure against this problem, the withstand voltage of the thyristor can be increased. However, since the resistance of the thyristor increases as the withstand voltage increases, the resistance loss of the thyristor, resulting in a rectifying loss for the power supply apparatus, becomes larger.

Instead of improving the withstand voltage of the thyristor to absorb surge voltage, another solution is to employ a surge absorbing circuit, such as a snubber circuit. Although, rectifying losses can be reduced, such a power supply apparatus is large in size.

Alternatively, a silicon MOSFET (hereinafter, Si-MOSFET) can be used instead of the thyristor as the rectifier. The Si-MOSFET can cause the rectifying loss to be smaller than the thyristor. However, the withstand voltage of the Si-MOSFET against surge voltages is as low as the thyristor. Thus, the Si-MOSFET cannot solve the above problems, either.

SUMMARY OF THE INVENTION

The present invention is made in light of the foregoing problems, and it is an object of the present invention to provide a power supply system including a semiconductor switching element which has a high withstand voltage, yet maintains small rectifying losses.

For attaining the above object, the present inventors have examined various semiconductor switching elements in order to find an optimum switching element which can be substituted for a thyristor. As a result, the inventors have found that a silicon carbon MOSFET (hereinafter, SiC-MOSFET) is the most suitable semiconductor switching element.

A power supply system according to the present invention includes an alternating current generator, a storage battery and a rectifying device connected between the alternating current generator and the storage battery. The rectifying device rectifies an alternating output from the alternating current generator and supplies the rectified output to the storage battery. The rectifying device includes a semiconductor switching element which is formed by SiC material. The power supply system also includes a duty control device for controlling the duty ratio of the semiconductor switching element so that the alternating current generator can generate an alternating voltage set independently from the voltage of the storage battery.

In the power supply system according to the present invention, the semiconductor switching element of the rectifying device is formed by SiC material. As a result and as described in more detail below, even when a high surge voltage is generated by the current flowing through the semiconductor switching element, the semiconductor switching element can withstand the high surge voltage because of the high withstand voltage characteristic of SiC material. Therefore, since the power supply system is not damaged by surge voltages, the reliability of the system can be enhanced.

In addition, as described in more detail below, because the semiconductor switching element is formed by SiC material, the ON resistance is much lower than that of a semiconductor switching element formed by Si material. Accordingly, resistance losses of the semiconductor switching element can be remarkably reduced. As a result, the power supply system can generate a high efficiency rectified output from the output of the alternating current generator.

In the power supply system, first and second electrical loads can be connected to the alternating current generator. In this case, first and second rectifying devices are provided corresponding to the first and second electrical loads. The first and second rectifying devices are switched on and off according to duty ratios depending on required voltages for the first and second electrical loads.

Also, it is preferable that the semiconductor switching element is a SiC-MOSFET. Further, it is preferable that a resistor having a high resistance be connected in series to a parasitic diode generated in the SiC-MOSFET.

Alternatively, the power supply system according to the present invention can include a multi-phase alternating current generator, a storage battery and a multi-phase rectifying device connected between the alternating current generator and the storage battery. The multi-phase rectifying device rectifies the alternating output from the alternating current generator and supplies the rectified output to the storage battery. A SiC-MOSFET is provided for alternately passing and blocking the rectified output to the storage battery. A duty control device controls the duty ratio of the SiC-MOSFET. In the power supply system, since a single SiC-MOSFET passes or blocks the rectified output from the rectifying device, the structure of the power supply system is simplified and it is easy to control the duty cycle of the SiC-MOSFET.

Furthermore, it is preferable that the alternating current generator generates an optimum voltage depending on the rotational speed of a rotor of the alternating current generator. As a result, the alternating current generator can be operated so as to generate maximum output.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

A structure of an N-channel SiC-MOSFET will be explained with reference to FIGS. 8 and 9.

On a SiC $N^+$-type substrate 1 (corresponding to a drain electrode D in FIG. 9), an N-type withstand voltage layer 2 is epitaxially grown and formed. Further, on the surface of N-type withstand voltage layer 2, a P-type well region 3 is formed by ion implantation of aluminum. On the surface of P-type well region 3, an $N^+$-type region 8 (corresponding to a source electrode S in FIG. 9) is formed by ion implantation of nitrogen. Then, an opening is formed on a region of the wafer surface where a trench is to be formed. The opening is then masked with a resist or an insulating film, a trench 4 is created in a recessed configuration by the known dry etching method called reactive ion etching (R.I.E.). After that, on the surface of trench 4, a gate insulating film 5 of silicon oxide film is formed with a thermal oxidation process. Then a gate electrode 6 of doped polycrystalline silicon is formed in trench 4. After that, a field insulating film (not shown) is formed with a photolithographic process. Then, a nickel electrode 201 is formed to contact $N^+$-type region 8 (source electrode S) and P-type well region 3. Finally, a metal electrode 9 is added to contact the surface of $N^+$-type substrate 1 (drain electrode D) thereby completing an element.

Nickel electrode 201 is formed by sputtering or vacuum evaporation. As a result, an alloy layer (not shown) of nickel and SiC, having a high resistance value, is formed between nickel electrode 201 and P-type well region 3. The alloy layer serves as a resistor 200 having a high resistance.

Figure 9:
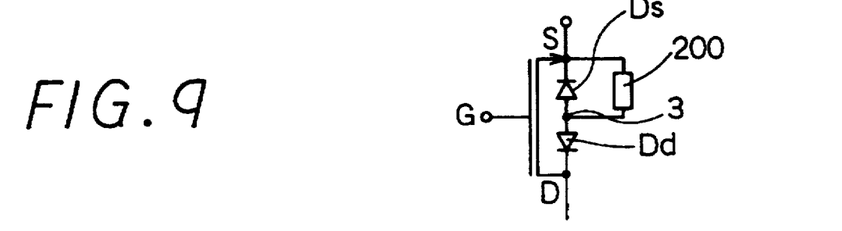
FIG. 9 is a circuit diagram illustrating an equivalent circuit of the SiC-MOSFET of FIG. 8.

FIG. 9 is a circuit diagram illustrating the equivalent circuit of the SiC-MOSFET. In this circuit, a source-side connected parasitic diode Ds and a drain-side connected parasitic diode Dd are formed in principle, between P-type well region 3 and $N^+$-type region 8 (source electrode) and between P-type well region 3 and $N^+$-type substrate 1 (drain electrode), respectively. Generally, in a standard MOSFET, P-type well region 3 and source electrode S or drain electrode D are short-circuited to provide a potential to P-type well region 3. In this case, current may flow through parasitic diode Dd or Ds regardless of the gate voltage of the SiC-MOSFET.

In the preferred embodiment of the present invention, source electrode S and P-type well region 3 are connected through resistor 200 having a high resistance, thereby adding a potential to P-type well region 3 through resistor 200. As a result, resistor 200 can block the current flowing through parasitic diode Dd.

An advantages of the SiC-MOSFET as the semiconductor switching element, as compared to a Si-MOSFET, will now be described. The Si-MOSFET has the same structure as the SiC-MOSFET except for resistor 200 having a high resistance.

When a high voltage (for example, +300 V) is applied between $N^+$-type region 8 (source electrode S) and $N^+$-type substrate 1 (drain electrode D) when the SiC-MOSFET is turned off, a depletion layer 2a extends primarily toward N-type withstand voltage layer 2 to withstand such a high voltage. Consequently, N-type withstand voltage layer 2 serves as a source feedback resistance Rs (See FIG. 8) and is connected in series to source electrode S. As a result, the channel resistance of the SiC-MOSFET increases. This causes the resistance loss of the SiC-MOSFET, and the rectifying loss of a power supply using such a device, to be greater.

However, since the SiC-MOSFET is formed from monocrystalline SiC, the thickness of N-type withstand voltage layer 2 can be made thinner than with a Si-MOSFET and the impurity concentration thereof can be greatly improved, compared with the Si-MOSFET.

For example, when the withstand voltage of N-type withstand voltage layer 2 is set to 300 volts, the design condition of N-type withstand voltage layer 2 in the SiC-MOSFET is different from that in the Si-MOSFET. The breakdown electric field strength of Si is about 30 V/um. When only N-type withstand voltage layer 2 is provided to withstand 300 volts, the required thickness of N-type withstand voltage layer 2 must be about 20 um, the impurity concentration thereof is $1 \times 10^{15}$ atoms/cm$^3$, and the resistivity thereof is about 5$\Omega$.cm.

On the other hand, the breakdown electric field strength of SiC is about 400 V/um. Consequently, the required thickness of N-type withstand voltage layer 2 must be about 4 um, the impurity concentration thereof is $2 \times 10^{16}$ atoms/cm$^3$, and the resistivity thereof is about 1.25 $\Omega$.cm.

Therefore, the resistance value of N-type withstand voltage layer 2 in the SiC-MOSFET can be reduced to 1/20 that of N-type withstand voltage layer 2 in the Si-MOSFET. As a result, the channel resistance of the SiC-MOSFET can be greatly reduced, compared to that of the Si-MOSFET.

Figure 10:
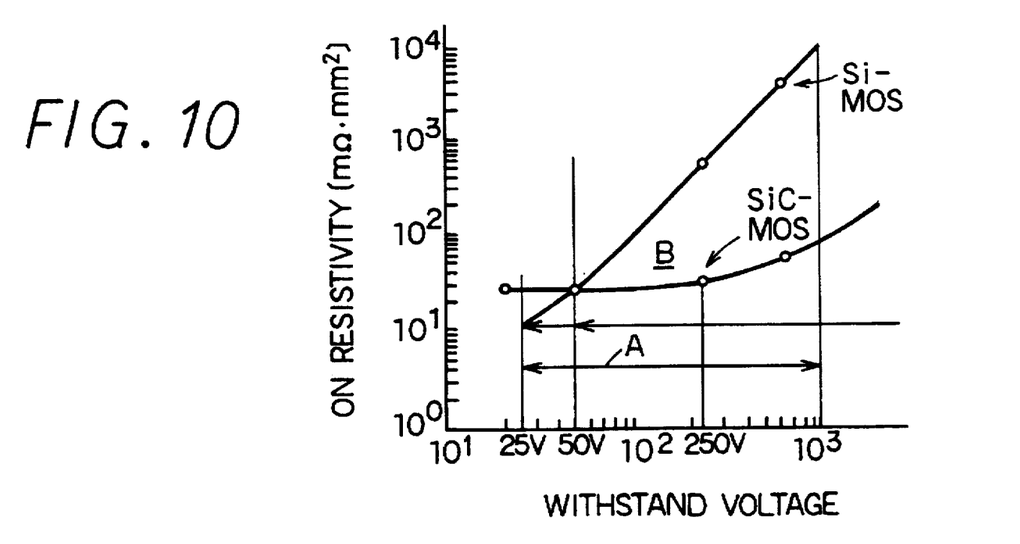
FIG. 10 is a graph illustrating a relationship between the ON resistance and the withstand voltage of a SiC-MOSFET and a Si-MOSFET.

FIG. 10 shows one example of the result of calculations with respect to ON resistivity when the required withstand voltage of the SiC-MOSFET is changed. A range A shows the desired withstand voltage range for the semiconductor switching element, and a range B is where the SiC-MOSFET is more effective than the Si-MOSFET.

In general, the channel resistance of a MOSFET virtually does not change even if the withstand voltage increases (when an increase in the channel resistance from an increase in source feedback resistance Rs is ignored). However, the resistance of N-type withstand voltage layer 2 increases while a positive correlation is maintained with respect to the withstand voltage. According to the relationship between ON resistivity and withstand voltage in FIG. 10, the ON resistivity of the Si-MOSFET increases in proportion to an increase in the withstand voltage from a level in the vicinity of a withstand voltage of 25 volts. However, the resistance of N-type withstand voltage layer 2 in the SiC-MOSFET does not increase much up to a withstand voltage of 250 volts, and the ON resistivity of the SiC-MOSFET slowly increases only after the withstand voltage exceeds 250 volts. In addition, when the withstand voltage is set to 50 volts or more, the ON resistivity of the SiC-MOSFET is lower than that of the Si-MOSFET.

The ON resistivity is a sum of the channel resistance and the resistance of N-type withstand voltage layer 2. The channel resistance varies with various factors. However, as shown in FIG. 10, the resistance of N-type withstand voltage layer 2 becomes predominant when the withstand voltage is high.

Therefore, if the SiC-MOSFET is used for a power supply system, the resistance loss of the SiC-MOSFET, resulting in a rectifying loss of the power supply, can be remarkably reduced. Thus, the alternating current generator using the SiC-MOSFET can provide an output having an outstanding efficiency, which is unpredictable from the thyristor or the Si-MOSFET. The same advantage can be produced by using a P-channel SiC-MOSFET instead of the N-channel SiC-MOSFET.

A first embodiment of the power supply system of the present invention will be described in detail with reference to FIGS. 1 to 4B. The power supply system has an alternating current generator 10 mounted on the vehicle. Alternating current generator 10 is composed of armature coils 11 to 13, which are three phase coils, each connected at one end to the others, and field coil 14 wound on a rotor. When an engine of the vehicle rotates the rotor, a three phase alternating voltage is induced in armature coils 11 to 13 in response to field current if flowing through field coil 14.

Figure 1:
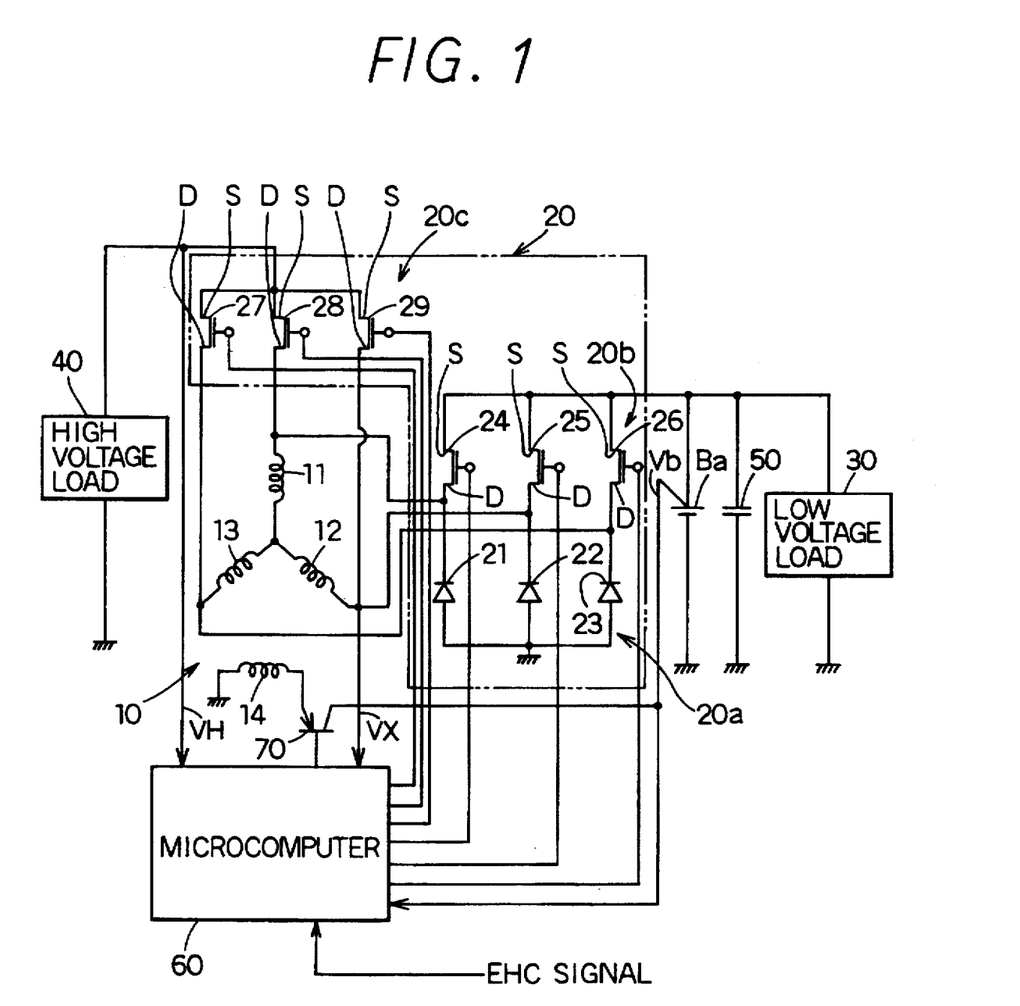
FIG. 1 is a circuit diagram illustrating a power supply system according to a first embodiment of the present invention.

The power supply system has a rectifying device 20. Rectifying device 20 is composed of a low side half bridge circuit 20a and first and second high side half bridge circuits 20b and 20c. Low side half bridge circuit 20a includes diodes 21 to 23 formed of SiC material. Anodes of diodes 21 to 23 are grounded. Cathodes thereof are connected to output terminals of armature coils 11 to 13, respectively.

Figure 8:
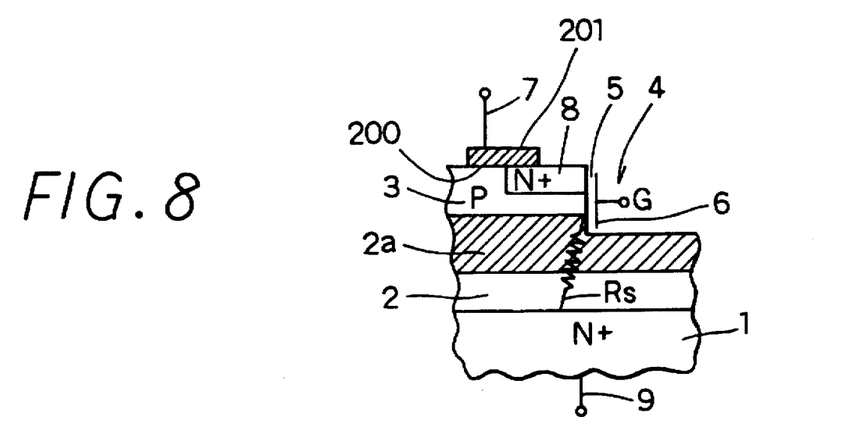
FIG. 8 is a cross sectional view of a SiC-MOSFET.

In the first embodiment, diodes 21 to 23 are formed by PN junctions in a structure of a SiC-MOSFET as shown in FIG. 8. First high side half bridge circuit 20b forms a three-phase rectifying circuit for a low voltage load 30 along with low side half bridge circuit 20a. First high side half bridge circuit 20b has three SiC-MOSFETS 24 to 26 in which a resistor 200 having a high resistance is connected in series to a parasitic diode Dd, as shown in FIGS. 8 and 9. Drain electrodes D of SiC-MOSFETS 24 to 26 are connected to the cathodes of diodes 21 to 23, respectively. Source electrodes S of SiC-MOSFETS 24 to 26 are connected to a plus terminal of a battery Ba. Low voltage load 30 in the vehicle is connected across battery Ba. A capacitor 50 is connected across low voltage load 30.

Second high side half bridge circuit 20c forms a three-phase rectifying circuit for a high voltage load 40 along with low side half bridge circuit 20a. Second high side half bridge circuit 20c has three SiC-MOSFETS 27 to 29 in which a resistor 200 having a high resistance is connected in series to a parasitic diode Dd, as shown in FIGS. 8 and 9. Drain electrodes D of SiC-MOSFETS 27, 28 and 29 are connected to the cathodes of diodes 23, 21 and 22, respectively. Source electrodes S of SiC-MOSFETS 27 to 29 are connected to high voltage load 40 in the vehicle and the other side of high voltage load 40 is grounded. High voltage load 40 in a vehicle can include an electric heating catalyzer (hereinafter, EHC), for example.

Each of SiC-MOSFETS 24 to 29 in first and second high side half bridge circuits 20b and 20c has a structure shown in FIGS. 8 and 9. When control signals are provided to each gate of SiC-MOSFETS 24 to 29 from a microcomputer 60, each of SiC-MOSFETS 24 to 29 serves not only as a rectifier but also as a switching element for duty cycle control.

A collector of power transistor 70 is connected to the plus terminal of battery Ba. An emitter of power transistor 70 is connected to field coil 14. The other terminal of field coil 14 is grounded. The gate of transistor 70 is connected to microcomputer 60. As a result, power transistor 70 is controlled by microcomputer 60 and is switched on and off alternately when the base thereof receives a control signal from microcomputer 60.

Figure 2:
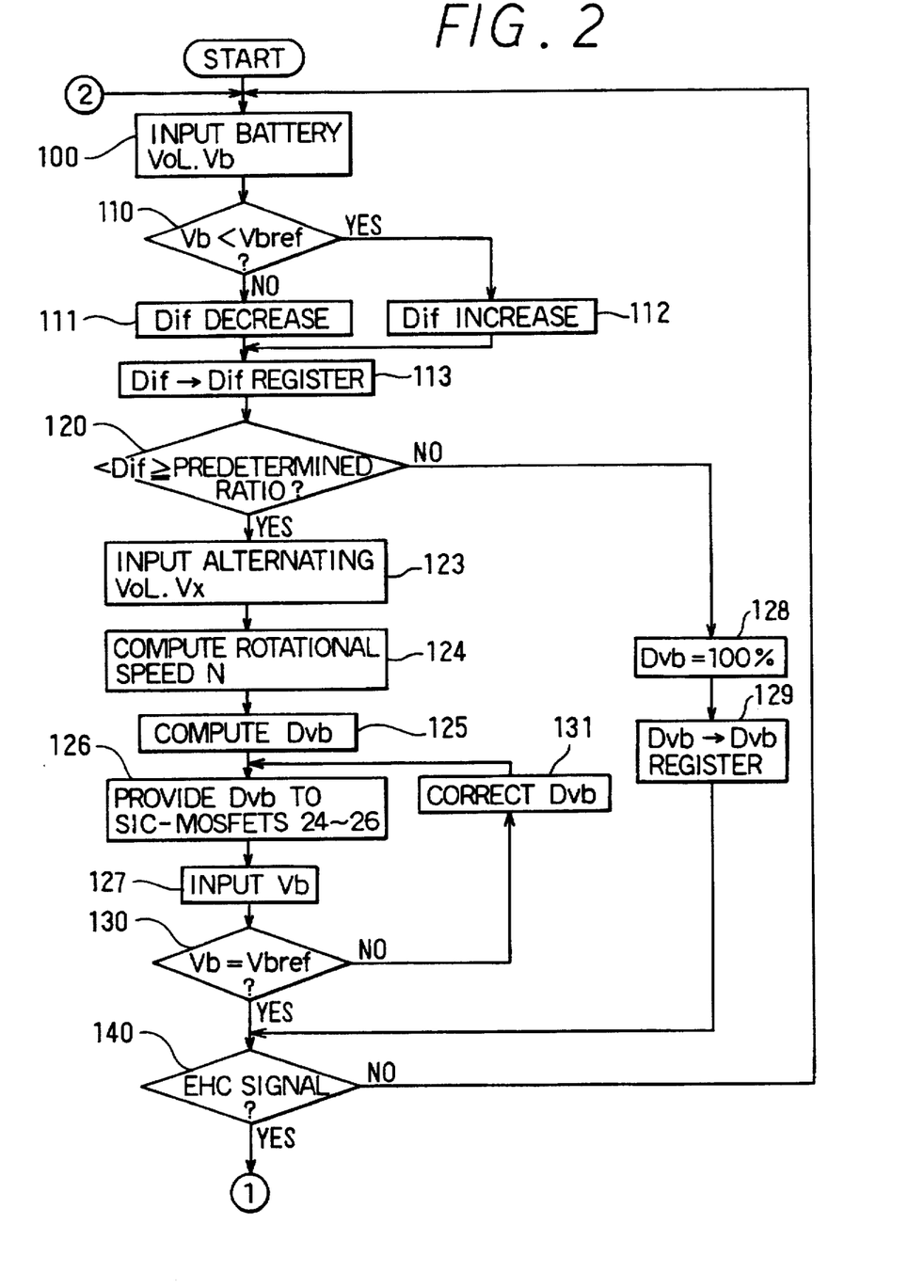
FIG. 2 is a first portion of a flow chart illustrating the process performed by the microcomputer of FIG. 1.
Figure 3:
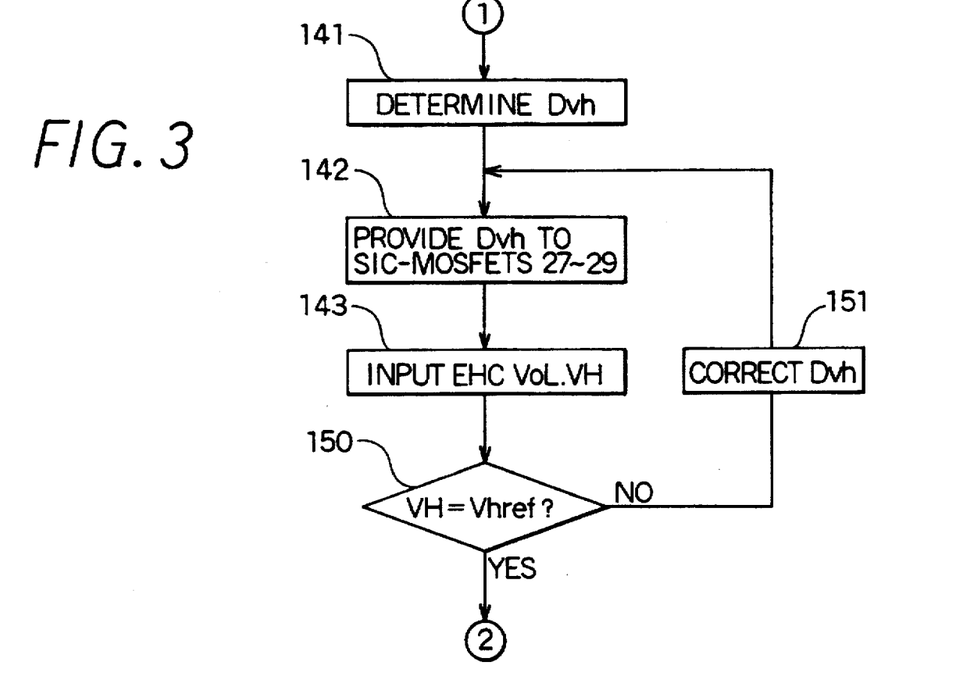
FIG. 3 is a second portion of the flow chart illustrating the process performed by the microcomputer of FIG. 1.
Figure 4A:
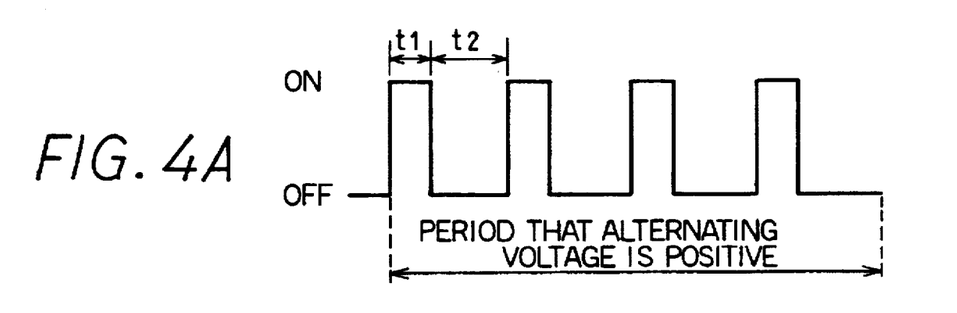
FIGS. 4A and 4B are timing charts illustrating waveforms of duty signals provided to each SiC-MOSFET in the first and second high-side half bridge circuits of FIG. 1.
Figure 4B:
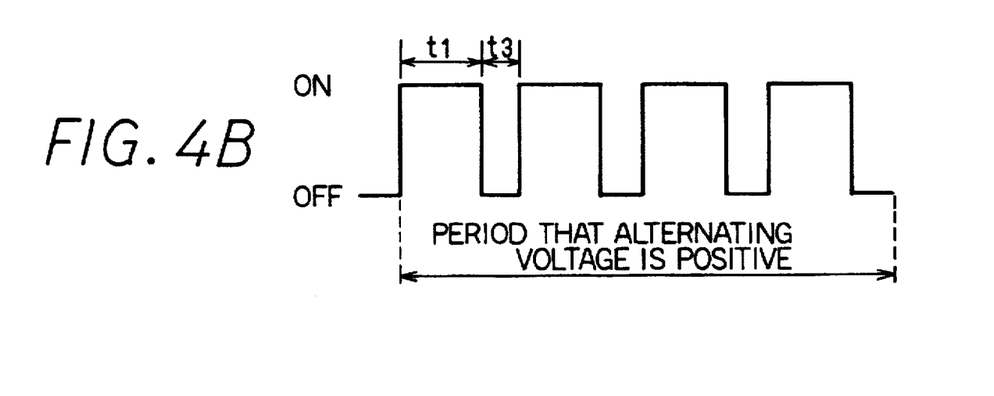

Microcomputer 60 executes a computer program according to the flow chart shown in FIGS. 2 and 3. Microcomputer 60 performs processes to control the duty cycle of each of SiC-MOSFETS 24 to 29 and power transistor 70 connected to field coil 14. The computer program is stored in a ROM in microcomputer 60. Microcomputer 60 is positioned close to, but thermally isolated from, rectifying device 20.

Microcomputer 60 begins executing the computer program according to the flow charts shown in FIGS. 2 and 3 when the engine of the vehicle and the power supply system are operated by turning on an ignition switch of the vehicle.

At step 100, a direct voltage Vb of battery Ba (hereinafter, battery voltage Vb) is provided to microcomputer 60. At step 110, battery voltage Vb is compared with a reference voltage Vbref. Reference voltage Vbref is set to 13.5 volts since the normal battery voltage is 12 volts. When Vb<Vbref, a duty ratio Dif of a duty control signal provided to power transistor 70, for controlling a field current If, is increased at step 112. When Vb≦Vbref, duty ratio Dif is decreased at step 111. At step 113, the duty ratio Dif is set to a Dif register of microcomputer 60. As a result, microcomputer 60 provides a duty control signal (first duty output signal) corresponding to duty ratio Dif. Power transistor 70 is switched on and off repeatedly according to duty ratio Dif. Therefore, battery voltage Vb is converted to a voltage value corresponding to duty ratio Dif by the switching of power transistor 70 and then the converted voltage is applied to field coil 14. As a result, field current If flows through field coil 14. The field current varies in response to the value of the converted voltage. The three-phase alternating voltage generated at armature coils 11 to 13 in alternating current generator 10 is controlled in response to field current If.

Next, at step 120, it is determined whether or not duty ratio Dif is equal to or greater than a predetermined ratio (i.e., 90%). When the determination is negative, it is determined that the electrical load is small enough so that proper electrical power can be supplied only by controlling field current If. In this case, SiC-MOSFETS 24 to 26 of first high side half bridge circuit 20b only serve as rectifiers. That is, each of SiC-MOSFETS 24 to 26 is switched on while the corresponding three-phase alternating voltage is positive and is switched off while the corresponding three-phase alternating voltage is negative. At step 128, a duty ratio Dvb is set to 100%. After that, the duty ratio Dvb is stored in a Dvb register at step 129. A duty control signal (second duty output signal) corresponding to duty ratio Dvb stored in the Dvb register is provided to the gates of SiC-MOSFETS 24 to 26.

When the determination at step 120 is affirmative, it is determined that low voltage load 30 is heavy. In this case, sufficient electrical power cannot be supplied to low voltage load 30 by further increasing field current If. Therefore, at step 123, alternating voltage Vx generated at armature coil 12 is inputted to microcomputer 60. At step 124, rotational speed N of alternating current generator 10 is computed based on a frequency of alternating voltage Vx. At step 125, duty ratio Dvb to control the duty cycle of each of SiC-MOSFETS 24 to 26 is computed based on an equation Vo=0.012×N, where Vo stands for an optimum generating voltage at which alternating current generator 10 can supply a maximum output at the rotational speed N. Since generating voltage Vo multiplied by duty ratio Dvb is the voltage supplied to battery Ba and low voltage load 30, by setting duty ratio Dvb so that the supplied voltage matches reference voltage Vbref, that is, by setting Dvb=Vbref/Vo, alternating current generator 10 can generate the optimum voltage Vo independently from battery voltage Vb. ON and OFF periods of SiC-MOSFETS 24 to 26 are determined from duty ratio Dvb. That is, Dvb={t1/(t1+t2)}×100% (See FIG. 4A).

The equation, Vo=0.012×N, is derived as described below. In alternating current generator 10, when the rotational speed N is 1000 rpm, 2000 rpm or 3000 rpm, the optimum generating voltage Vo is 12 volts, 24 volts or 36 volts, respectively. Thus, the ratio of Vo/N is 0.012. The equation is stored in the ROM of microcomputer 60.

After the process of step 125 is terminated, the second duty output signal corresponding to duty ratio Dvb is provided to each gate of SiC-MOSFETS 24 to 26 of first high side half bridge circuit 20b at step 126. At step 127, battery voltage Vb is read by microcomputer 60. If battery voltage Vb does not correspond to reference voltage Vbref, the determination at step 130 is negative, microcomputer 60 proceeds to step 131. At step 131, duty ratio Dvb is corrected so as to approach a duty ratio corresponding to reference voltage Vbref. After that, the second duty output signal corresponding to corrected duty ratio Dvb is provided to SiC-MOSFETS 24 to 26 at step 126.

When the second duty output signal is provided at step 126, each of SiC-MOSFETS 24 to 26 is switched on and off according to duty ratio Dvb. As a result, alternating current generator 10 can generate the optimum voltage Vo independently from battery voltage Vb and the voltage converted from the optimum voltage is applied to low voltage load 30 even under heavy loads.

When the determination at step 130 is affirmative, it is determined at step 140 whether an EHC signal from an engine ECU (not shown) is received or not. The EHC signal is a signal showing a driving command to a high voltage load 40 and is provided, for example, from the engine ECU for a couple of seconds after an ignition switch of the vehicle is turned on.

When the EHC signal is received, the determination at step 140 is affirmative and microcomputer 60 proceeds to step 141 (See FIG. 3). At step 141, a duty ratio Dvh is determined from a ratio of VH/Vo (that is, a ratio of an EHC voltage VH detected from high voltage load 40 against optimum generating voltage Vo of alternating current generator 10). Duty ratio Dvh is expressed as {t1/(t1+t3)}× 100% (See FIG. 4B). When VH>Vx, duty ratio Dvh is set to 100%. A third duty output signal corresponding to duty ratio Dvh is provided to each gate of SiC-MOSFETS 27 to 29 of second high side half bridge circuit 20c at step 142.

At step 143, EHC voltage VH of high voltage load 40 is read by microcomputer 60. When the read voltage does not correspond to a reference voltage Vhref (for example, 24 volts), the determination at step 150 is negative. In this case, duty ratio Dvh is corrected at step 151 so that EHC voltage VH approaches reference voltage Vhref. At step 142, the third duty output signal corresponding to the corrected duty ratio Dvh is provided to SiC-MOSFETS 27 to 29. When the third duty output signal is provided, each of SiC-MOSFETS 27 to 29 is switched on and off according to duty ratio Dvb. Therefore, alternating current generator 10 can generate the optimum voltage Vo independently from battery voltage Vb and the voltage converted from the optimum voltage is applied to high voltage load 40.

When the determination at step 140 is negative, the process of microcomputer 60 proceeds not to step 141 but to step 100. In this case, each of SiC-MOSFETS 27 to 29 are remained off.

As described above, in first and second high side half bridge circuits 20b and 20c of rectifying device 20, SiC-MOSFETS 24 to 29 are semiconductor switching elements which serve as rectifiers for the output from alternating current generator 10. Thus, even when high surge voltages are generated in response to currents flowing through SiC-MOSFETS 24 to 29 when SiC-MOSFETS 24 to 29 are switched on and off, SiC-MOSFETS 24 to 29 can withstand the high surge voltages due to the high withstand voltage characteristics of SiC material. In the first embodiment, alternating current generator 10 generates a higher voltage than battery voltage Vb. Since the surge voltage becomes higher in proportion to the generating voltage of alternating current generator 10, making the semiconductor switching elements from SiC material is especially effective. As a result, since the power supply system is not damaged by the surge voltage, the reliability of the power supply system can be improved.

In addition, since the ON resistance of each of SiC-MOSFETS 24 to 29 is low, resistance losses of the SiC-MOSFETS, and the corresponding rectifying losses of the power supply system, are small. As a result, the power supply system can generate a high efficiency rectified output from the output of the alternating current generator. Moreover, because of the small resistance losses, SiC-MOSFETS 24 to 29 generate little heat. Thus, SiC-MOSFETS 24 to 29 do not need to be cooled. Since the power supply system does not need a structure to cool SiC-MOSFETS 24 to 29, it can be small in size.

Furthermore, SiC-MOSFETS 24 to 29 have good high speed switching characteristics. Thus, even when the rotor of alternating current generator 10 rotates at a high speed, SiC-MOSFETS 24 to 29 can switch fast enough for high speed rotation.

In the first embodiment, resistor 200 having a high resistance is connected in series to parasitic diode Dd generated in each of SiC-MOSFETS 24 to 29. If SiC-MOSFETS without resistors 200 were used, when the source terminals thereof are connected to armature coils 11 to 13, currents would flow through parasitic diodes Dd from armature coils 11 to 13 while SiC-MOSFETS in first high side half bridge 20b are off. As a result, the voltage rectified by the SiC-MOSFETS would not correspond to the second duty output signal and alternating current generator 10 could not generate the optimum generating voltage. Currents would also flow through parasitic diode Dd in the SiC-MOSFETS in second high side half bridge 20c even when the SiC-MOSFETS were off. As a result, current would flow into high voltage load 40 all the time, wasting electrical power.

Alternatively, when the drain terminals of SiC-MOSFETS without resistors 200 are connected to armature coils 11 to 13, the currents generated by alternating current generator 10 would flow backward through parasitic diode Dd in first and second high side half bridge circuits 20b, 20c. This is caused by the fact that since the three-phase alternating voltage is generated at the armature coils, the potential of one of the armature coils is lower than the potential of first and second high side half bridge circuit 20b and 20c. As a result, the parasitic diode Dd connected to the one of armature coils would become conductive.

Therefore, when SiC-MOSFETS are used in first and second high side half bridge circuits 20b and 20c, the undesirable conductivity of the parasitic diodes in the SiC-MOSFETS should be prevented. In the first embodiment, each of SiC-MOSFETS 24 to 29 has resistor 200 having a high resistance, which is connected in series to parasitic diode Dd. Thus, the current flowing through parasitic diode Dd can be remarkably reduced. It enables power to be supplied to high voltage load 40 efficiently, while enabling satisfactory duty control. If SiC-MOSFETS without resistors 200 are used, it is possible to replace each such SiC-MOSFET 24 to 29 with two SiC-MOSFETS without resistors 200. The MOSFETS are connected with the drain of one of the MOSFETS connected to the source of the other MOSFET. In this case, however, the number of SiC-MOSFETS doubles.

In the first embodiment, since diodes 21 to 23 in low side half bridge circuit 20a are formed of SiC material, the rectifying losses thereof are low. Therefore, diodes 21 to 23 do not need to be cooled. Since the power supply system does not need a cooling structure, the size of the system can be small.

Figure 5:
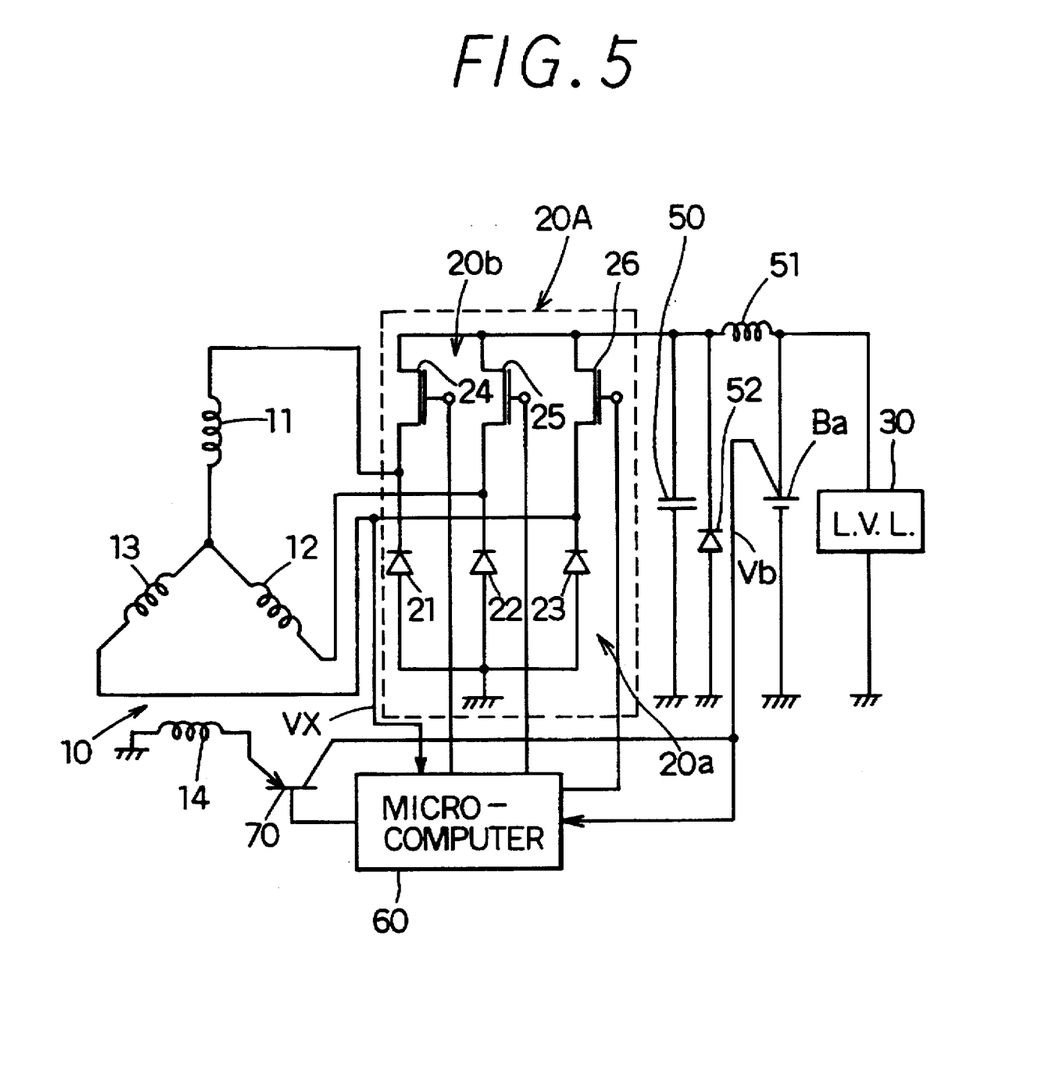
FIG. 5 is a circuit diagram illustrating a power supply system according to a second embodiment of the present invention.

FIG. 5 shows a second embodiment. The second embodiment employs a rectifying device 20A instead of rectifying device 20.

In rectifying device 20A, second high side half bridge circuit 20c of rectifying device 20 is omitted. That is, this embodiment supplies only a single electrical load (low voltage load 30). This embodiment achieves the same function and result as the first embodiment except with regard to second high side half bridge circuit 20c. In the circuit shown in FIG. 5, an inductance 51 and a feedback diode 52 are added. However, since they are to smooth the current, they can be omitted. Of course, they could also be added to the first embodiment.

Figure 6:
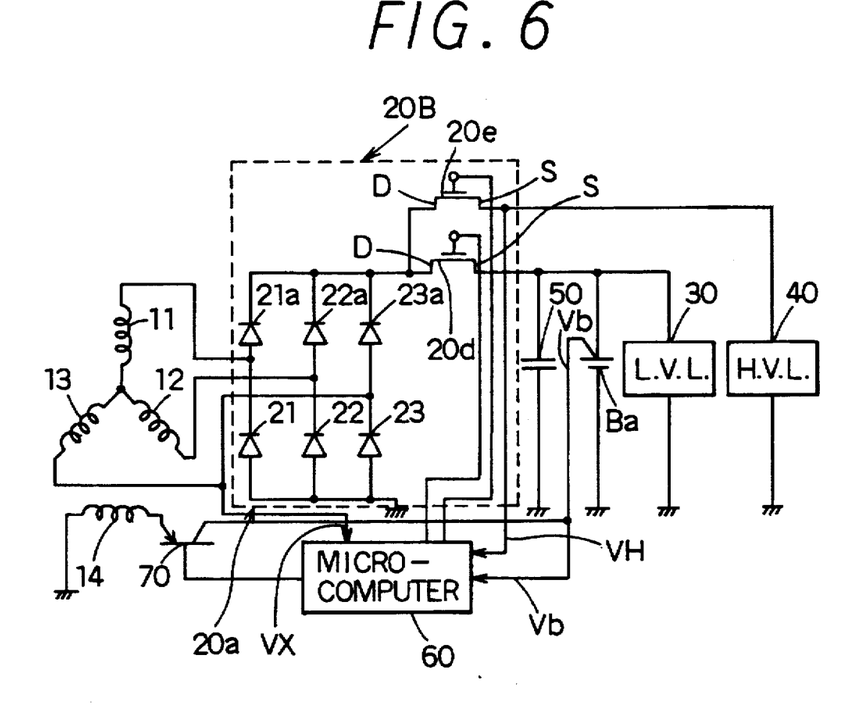
FIG. 6 is a circuit diagram illustrating a power supply system according to a third embodiment of the present invention.

FIG. 6 shows a third embodiment. The third embodiment uses rectifying device 20B instead of rectifying device 20.

Rectifying device 20B includes diodes 21 to 23 forming low side half bridge circuit 20a, diodes 21a to 23a, forming a three-phase rectifying circuit along with diodes 21 to 23, and SiC-MOSFETS 20d and 20e. Diodes 21a to 23a are formed of SiC material. Anodes of diodes 21a to 23a are connected to cathodes of diodes 21 to 23, respectively. The drain electrodes D of SiC-MOSFETS 20d and 20e are connected to the anodes of diodes 21a to 23a. The source electrode S of SiC-MOSFET 20d is connected to the plus terminal of battery Ba. The source electrode S of SiC-MOSFET 20e is connected to high voltage load 40. The other side of high voltage load 40 is grounded.

The gate electrodes of SiC-MOSFETS 20d and 20e are connected to microcomputer 60. Each of SiC-MOSFETS 20d and 20e is controlled by microcomputer 60 like SiC-MOSFETS 24 to 29 in the first embodiment.

According to the third embodiment, since the switching operations in first and second high side half bridge circuits 20b and 20c can be realized by single SiC-MOSFET 20d and single SiC-MOSFET 20e, respectively, the circuit structure is simplified and duty control is easy to perform. In addition, the ON resistances of SiC-MOSFETS 20d and 20e are so small that SiC-MOSFETS 20d and 20e do not need to be cooled. If the power supply system does not have a high voltage load 40, SiC-MOSFET 20e can be omitted.

Figure 7:
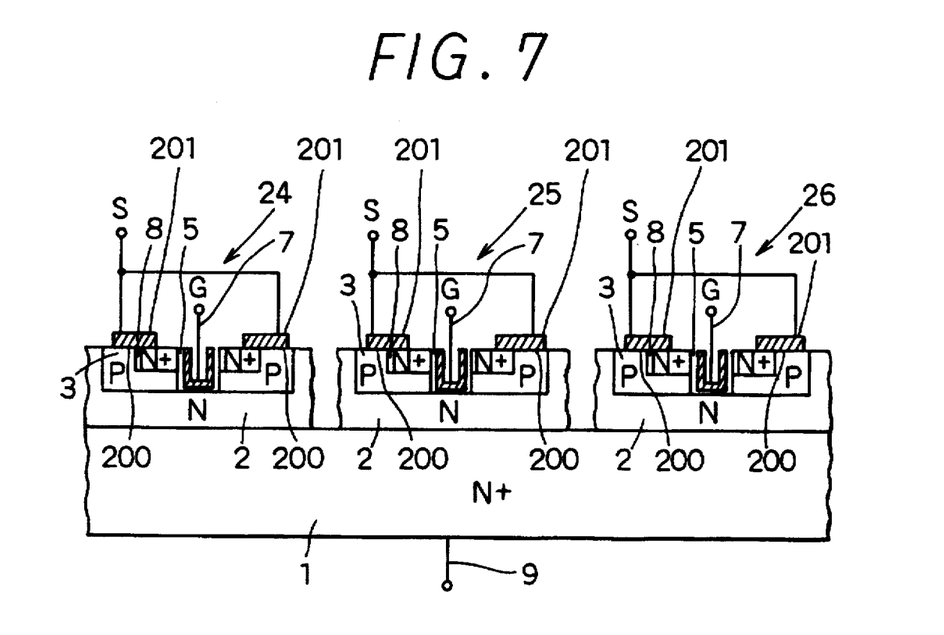
FIG. 7 is a cross sectional view of each SiC-MOSFET in the first high-side half bridge circuit.

FIG. 7 shows an embodiment of SiC-MOSFETS 24 to 26 formed on a single substrate. An $N^=$-type substrate 1 is connected to a common drain electrode D (9) of SiC-MOSFETS 24 to 26. On $N^+$-type substrate 1, P-type well regions 3 of SiC-MOSFETS 24 to 26 are formed with a sufficient distance therebetween. The distance is set so as not to generate a punch-through. In a surface portion of each P-type well region 3, $N^+$-type region 8 (source electrode S) is formed individually. In each of SiC-MOSFETS 24 to 26, gate electrode 7 is disposed on the surface portion of P-type well region 3 via insulating film 5. $N^+$-type region 8 is connected electrically to withstand voltage layer 2 by gate electrode 7.

In each of SiC-MOSFETS 24 to 26, nickel electrode 201 is formed by sputtering or vacuum evaporation. As a result, an alloy layer (not shown) of nickel and SiC having a high resistance value is formed between nickel electrode 201 and P-type well region 3. The alloy layer serves as resistor 200 having a high resistance.

With this structure, three SiC-MOSFETS 24 to 26 can be integrated on a single chip without additional forming processes. Since the rectifying loss and electrical power loss of SiC-MOSFETS 24 to 26 are small, SiC-MOSFETS 24 to 26 do not generate much heat.

The construction illustrated in FIG. 7 is also applicable to each of SiC-MOSFETS 27 to 29.

In the above embodiments, microcomputer 60 can be packaged as one unit with rectifying device 20 as long as thermal isolation is provided. However, microcomputer 60 can be thermally isolated from rectifying device 20 by attaching each element of rectifying device 20 to alternating current generator 10 separately.

In addition, the function of microcomputer 60 can be performed by the engine ECU, if the engine ECU has sufficient capacity. High voltage load 40 is not limited to an electric heating catalyzer and can be, for example, a heating coil built in a window of a vehicle. Each of diodes 21 to 23 in low side half bridge circuit 20a can be replaced with SiC-MOSFETS. Further, SiC-MOSFETS and diodes formed by SiC material can be mixed in first or second high side bridge circuit 20b or 20c and low side half bridge circuit 20a. In this case, one SiC-MOSFET is disposed at each of the three phases completed by high side half bridge circuit 20b or 20c and low side half bridge circuit 20a. Alternating current generator 10 is not limited to a three-phase alternating current generator and can be single-phase or multi-phase other than three-phase.

Furthermore, the function of each step of the flow charts in the above-described embodiments can be realized by hard logic circuits.

What is claimed is:

1. A power supply system comprising:
   an alternating current generator;

a storage battery;

a rectifying device connected between said alternating current generator and said storage battery for rectifying alternating voltage from said alternating current generator and supplying rectified voltage to said storage battery, said rectifying device including a semiconductor switching element formed by SiC material;

a smoothing circuit connected between said rectifying device and said storage battery, for smoothing current based on said rectified voltage to be supplied to said storage battery; and duty control means for switching said semiconductor switching element on and off according to a duty ratio, wherein said alternating current generator can generate an alternating voltage set independently from a voltage of said storage battery.

2. A power supply system as claimed in claim 1, wherein said semiconductor switching element is SiC-MOSFET.

3. A power supply system as claimed in claim 1, wherein said duty ratio is determined so that said alternating current generator can generate an optimum voltage in proportion to a rotational speed of a rotor of said alternating current generator.

4. A power supply system comprising:

an alternating current generator;

a storage battery;

a first rectifying device connected between said alternating current generator and said storage battery for rectifying alternating voltage from said alternating current generator and supplying rectified voltage to said storage battery, said first rectifying device including a first semiconductor switching element formed by SiC material;

a second rectifying device connected to said alternating current generator for rectifying alternating voltage from said alternating current generator and supplying rectified voltage, said second rectifying device including a second semiconductor switching element formed by SiC material; and duty control means for switching said first and second semiconductor switching elements on and off according to respective duty ratios.

5. A power supply system as claimed in claim 4, wherein said duty ratios are determined, respectively, so that said alternating current generator can generate an optimum voltage in proportion to a rotational speed of a rotor of said alternating current generator.

6. A power supply system as claimed in claim 4, further comprising a first electrical load connected across said storage battery and a second electrical load connected to said second rectifying means, wherein said duty control means includes first duty control means for switching said first semiconductor switching element on and off according to said duty ratio corresponding to a voltage required for driving said first electrical load, second duty control means for switching said second semiconductor switching element on and off according to said duty ratio corresponding to a voltage required for driving said second electrical load, and control switching means for determining whether or not a command to drive said second electrical load is present, for allowing only said first duty control means to switch said first semiconductor switching element on and off when said command is not present and for allowing said first and second duty control means to switch said first and second semiconductor switching elements on and off when said command is present.

7. A power supply system as claimed in claim 4, further comprising a first electrical load connected across said storage battery and a second electrical load connected to said second rectifying means, wherein said second electrical load needs higher voltage than said first electrical load.

8. A power supply system as claimed in claim 4, wherein said first and second semiconductor switching elements are SiC-MOSFETS.

9. A power supply system as recited in claim 1, wherein
said alternating current generator includes multi-phase armature coils;

said rectifying device comprises a multi-phase rectifying device connected between said multi-phase armature coils and said storage battery for rectifying multi-phase alternating voltage from said multi-phase armature coils and supplying rectified voltage to said storage battery, said rectifying device including a plurality of SiC-MOSFETS which are connected to each output line of said multi-phase armature coils, and are turned on or off depending on a sign of a corresponding alternating voltage in order to rectify said multi-phase alternating voltage; and said duty control means switches said plurality of SiC-MOSFETS on and off with a period shorter than an alternating voltage period, thereby performing duty control.

10. A power supply system as claimed in claim 9, wherein a duty ratio of said duty control is determined so that said multi-phase armature coils can generate an optimum voltage in proportion to a rotational speed of a rotor of said multi-phase armature coils.

11. A power supply system as claimed in claim 9, wherein said duty control means performs said duty control only when said multi-phase alternating voltage is positive.

12. A power supply system as claimed in claim 9, further comprising a resistor having a high resistance connected in series to a parasitic diode generated in each of said SiC-MOSFETS.

13. A power supply system as recited in claim 1, wherein
said alternating current generator includes multi-phase armature coils; and said rectifying device includes a multi-phase rectifying device connected between said multi-phase armature coils and said storage battery for performing rectification of a multi-phase alternating voltage from said multi-phase armature coils and supplying rectified voltage to said storage battery, said rectifying device including a plurality of SiC-MOSFETS, at least one of which is connected to each output line of said multi-phase armature coils., said duty control means turning said SiC-MOSFETS on or off depending on a sign of a corresponding alternating voltage in order to rectify said multi-phase alternating voltage, said SiC-MOSFETS being switched on and off with a period shorter than an alternating voltage period, thereby performing duty control.

14. A power supply system as claimed in claim 13, wherein a duty ratio of said duty control is determined so that said multi-phase armature coils can generate an optimum voltage in proportion to a rotational speed of a rotor of said multi-phase armature coils.

15. A power supply system as claimed in claim 13, wherein said duty control is performed only when said multi-phase alternating voltage is positive.

16. A power supply system as claimed in claim 13, wherein said rectifying device also includes a plurality of diodes formed by SiC material.

17. A power supply system as claimed in claim 13, further comprising a resistor having a high resistance, connected in series to a parasitic diode generated in each of said SiC-MOSFETS.

18. A power supply system comprising:

a multi-phase alternating current generator;

a storage battery;

a first electrical load connected in parallel to said storage battery;

a second electrical load;

a first multi-phase rectifying device connected between said multi-phase alternating current generator and said storage battery for performing a rectification of a multi-phase alternating voltage from said multi-phase alternating current generator and supplying rectified voltage to said storage battery and said first electrical load, said first multi-phase rectifying device including a first high side half bridge circuit and a low side half bridge circuit, said first high side half bridge circuit including a plurality of SiC-MOSFETS which are connected to output lines of said multi-phase alternating current generator, respectively, and are turned on or off depending on a sign of a corresponding alternating voltage in order to rectify said multi-phase alternating voltage;

a second multi-phase rectifying device connected between said multi-phase alternating current generator and said second electrical load for performing a rectification of a multi-phase alternating voltage from said multi-phase alternating current generator and supplying rectified voltage to said second electrical load, said second multi-phase rectifying device including a second high side half bridge circuit and said low side half bridge circuit, said second high side half bridge circuit including a plurality of SiC-MOSFETS which are connected to output lines of said multi-phase alternating current generator, respectively, and are turned on or off depending on a sign of a corresponding alternating voltage in order to rectify said multi-phase alternating voltage;

duty control means for switching each of said SiC-MOSFETS in said first and second high side half bridge circuits on and off according to respective duty ratios, thereby performing duty control.

19. A power supply system as claimed in claim 18, wherein said duty ratios are determined so that said multi-phase alternating current generator can generate an optimum voltage in proportion to a rotational speed of a rotor of said multi-phase alternating current generator.

20. A power supply system as claimed in claim 18, wherein said low side half bridge circuit includes a plurality of diodes formed by SiC material.

21. A power supply system as claimed in claim 18, wherein said duty control means includes first duty control means for switching said plurality of SiC-MOSFETS in said first high side half bridge circuit on and off according to a duty ratio corresponding to a voltage required for driving said first electrical load, second duty control means for switching said plurality of SiC-MOSFETS in said second high side half bridge circuit on and off according to a duty ratio corresponding to a voltage required for driving said second electrical load, and control switching means for determining whether or not a command to drive said second electrical load is present, for allowing only said first duty control means to switch said plurality of SiC-MOSFETS on and off when said command is not present and for allowing said first and second duty control means to switch each of said plurality of SiC-MOSFETS on and off when said command is present.

22. A power supply system as claimed in claim 18, further comprising a resistor having a high resistance, connected in series to a parasitic diode generated in each of said SiC-MOSFETS.

23. A power supply system comprising:

a multi-phase alternating current generator;

a storage battery;

a first electrical load connected in parallel to said storage battery;

a second electrical load;

a first multi-phase rectifying device connected between said multi-phase alternating current generator and said storage battery for performing a rectification of a multi-phase alternating voltage from said multi-phase alternating current generator and supplying rectified voltage to said storage battery and said first electrical load, said first multi-phase rectifying device including a first high side half bridge circuit and a low side half bridge circuit, wherein said first high side half bridge and said low side half bridge circuits form first circuits to rectify said multi-phase alternating voltage, each of said first circuits including at least one SiC-MOSFET;

a second multi-phase rectifying device connected between said multi-phase alternating current generator and said second electrical load for performing a rectification of said multi-phase alternating voltage from said multi-phase alternating current generator and supplying rectified voltage to said second electrical load, said second multi-phase rectifying device including a second high side half bridge circuit and said low side half bridge circuit, wherein said second high side half bridge and said low side half bridge circuits form second circuits to rectify said multi-phase alternating voltage, each of said second circuits including at least one SiC-MOSFET; and duty control means for switching each of said SiC-MOSFETS in said first and second circuits on and off according to respective duty ratios, thereby performing duty control.

24. A power supply system as claimed in claim 23, wherein said duty ratios are determined so that said multi-phase alternating current generator can generate an optimum voltage in proportion to a rotational speed of a rotor of said multi-phase alternating current generator.

25. A power supply system as claimed in claim 23, wherein each of said first and second circuits includes a diode formed by SiC material.

26. A power supply system as claimed in claim 23, wherein said duty control means includes first duty control means for switching said SiC-MOSFETS in said first multi-phase rectifying device on and off according to a duty ratio corresponding to a voltage required for driving said first electrical load, second duty control means for switching said SiC-MOSFETS in said second multi-phase rectifying device on and off according to a duty ratio corresponding to a voltage required for driving said second electrical load, and control switching means for determining whether or not a command to drive said second electrical load is present, for allowing only said first duty control means to switch said SiC-MOSFETS on and off when said command is not present and for allowing said first and second duty control means to switch each of said SiC-MOSFETS on and off when said command is present.

27. A power supply system as claimed in claim 23, further comprising a resistor having a high resistance connected in series to a parasitic diode generated in each of said SiC-MOSFETS.

28. A power supply system comprising:
   a multi-phase alternating current generator;
   a storage battery;
   a multi-phase rectifying device connected between said multi-phase alternating current generator and said storage battery for rectifying an alternating voltage from said multi-phase alternating current generator and supplying rectified voltage to said storage battery;
   a SiC-MOSFET connected between said multi-phase rectifying device and said storage battery, capable of alternately passing and blocking said rectified voltage to said storage battery; and
   duty control means for switching said SiC-MOSFET on and off according to a duty ratio.

29. A power supply system as claimed in claim 28, wherein said duty ratio is determined so that said multi-phase alternating current generator can generate an optimum voltage in proportion to a rotational speed of a rotor of said multi-phase alternating current generator.

* * * * *